(12) United States Patent
Kraus

(10) Patent No.: US 7,803,090 B2
(45) Date of Patent: Sep. 28, 2010

(54) MOBILE ELLIPTICALLY DRIVEN DEVICE

(75) Inventor: David W. Kraus, Birmingham, AL (US)

(73) Assignee: HPN Holdings, Inc., Carson City, NV (US)

( * ) Notice: Subject to any disclaimer, the term of this patent is extended or adjusted under 35 U.S.C. 154(b) by 950 days.

(21) Appl. No.: 11/173,213

(22) Filed: Jul. 1, 2005

(65) Prior Publication Data

US 2007/0001422 A1 Jan. 4, 2007

(51) Int. Cl.
*A63B 22/06* (2006.01)
*B62M 1/00* (2006.01)

(52) U.S. Cl. ........................................ 482/62; 280/224

(58) Field of Classification Search .................... 482/51, 482/57, 62; 280/1, 30, 200, 210, 214, 221, 280/223–225, 230, 233, 234, 240, 242.1, 280/244–248, 253, 256, 257, 259, 260, 282, 280/771, 827, 828, 238; 475/277, 283, 288
See application file for complete search history.

(56) References Cited

U.S. PATENT DOCUMENTS

| | | | |
|---|---|---|---|
| 435,665 A | 9/1890 | Minnix | |
| 594,773 A | 11/1897 | Bartel | |
| 602,536 A | 4/1898 | Bassett | |
| 1,180,126 A | 4/1916 | Fullarton | |
| 1,397,174 A | 11/1921 | Morwood | |
| 1,398,883 A | 11/1921 | Mottlau | |
| 1,798,383 A | 3/1931 | Roberds | |
| 1,798,384 A | 3/1931 | Roberds | |
| 1,845,192 A | 2/1932 | Roberds | |
| 2,125,763 A | 8/1938 | Anderson | |
| 2,505,464 A | 4/1950 | DeBuit | |
| 3,895,825 A | 7/1975 | Sink | |
| 4,451,064 A | 5/1984 | Perkins | |
| 4,647,060 A | 3/1987 | Tomkinson | |
| 4,666,172 A | 5/1987 | Hartmann | |
| 4,702,121 A | 10/1987 | Hartmann | |
| 4,706,982 A | 11/1987 | Hartmann | |
| 4,715,246 A | 12/1987 | Hartmann | |
| 4,721,015 A * | 1/1988 | Hartmann | .................... 475/277 |
| 4,735,430 A | 4/1988 | Tomkinson | |
| 4,936,597 A | 6/1990 | Hartmann | |
| 4,986,556 A | 1/1991 | Hartmann | |
| 5,224,724 A | 7/1993 | Greenwood | |

(Continued)

FOREIGN PATENT DOCUMENTS

DE 195-02-630 7/1996

(Continued)

OTHER PUBLICATIONS

European Patent Office. Extended European Search Report. Oct. 19, 2009.

*Primary Examiner*—Loan Thanh
*Assistant Examiner*—Tam Nguyen
(74) *Attorney, Agent, or Firm*—Bradley Arant Boult Cummings, LLP

(57) ABSTRACT

A mobile wheeled device driven by a user's striding his feet on a pair of footbeds through an elliptical path while applying reciprocal force to a pair of upright arm members. The device may utilize an internal gear system in the rear hub.

14 Claims, 7 Drawing Sheets

U.S. PATENT DOCUMENTS

| | | | |
|---|---|---|---|
| 5,228,710 | A | 7/1993 | Lu |
| 5,242,343 | A | 9/1993 | Miller |
| 5,383,829 | A | 1/1995 | Miller |
| 5,527,246 | A | 6/1996 | Rodgers, Jr. |
| 5,591,107 | A | 1/1997 | Rodgers |
| 5,630,774 | A | 5/1997 | Geschwender |
| 5,775,708 | A | 7/1998 | Heath |
| 6,032,970 | A | 3/2000 | Porter |
| 6,045,487 | A | 4/2000 | Miller |
| 6,048,287 | A * | 4/2000 | Rohloff ............... 475/297 |
| 6,171,217 | B1 | 1/2001 | Cutler |
| 6,386,566 | B1 | 5/2002 | Freeberg |
| 6,398,695 | B2 | 6/2002 | Miller |
| 6,402,174 | B1 * | 6/2002 | Maurer ............... 280/267 |
| 6,419,252 | B1 | 7/2002 | Park |
| 6,468,178 | B1 * | 10/2002 | Mohtasham ............... 475/277 |
| 6,485,041 | B1 | 11/2002 | Janssen |
| 6,572,128 | B2 | 6/2003 | Graf |
| 6,663,127 | B2 | 12/2003 | Miller |
| 6,708,997 | B2 * | 3/2004 | Chait ............... 280/245 |
| 6,773,022 | B2 | 8/2004 | Janssen |
| 6,846,272 | B2 | 1/2005 | Rosenow et al. |
| 6,852,060 | B1 * | 2/2005 | Ash ............... 475/296 |
| 6,878,084 | B2 | 4/2005 | Hwang |
| 6,994,657 | B1 | 2/2006 | Eschenbach |
| 7,033,305 | B1 | 4/2006 | Stearns et al. |
| 7,223,210 | B2 * | 5/2007 | Krul et al. ............... 482/57 |
| 7,270,625 | B2 | 9/2007 | Miller |
| 2003/0127822 | A1 | 7/2003 | Fleck |
| 2003/0193158 | A1 | 10/2003 | Hung |
| 2004/0005960 | A1 * | 1/2004 | Chang ............... 482/52 |
| 2004/0209741 | A1 * | 10/2004 | Kuo ............... 482/52 |
| 2006/0009331 | A1 * | 1/2006 | Cheng ............... 482/52 |
| 2006/0049597 | A1 * | 3/2006 | Chan et al. ............... 280/93.504 |

FOREIGN PATENT DOCUMENTS

| | | |
|---|---|---|
| DE | 101-58-594 | 6/2003 |
| DE | 10158594 A1 * | 6/2003 |
| DE | 203-19-128 | 4/2004 |
| DE | 103-31-352 | 2/2005 |
| WO | 97/07860 | 3/1997 |

* cited by examiner

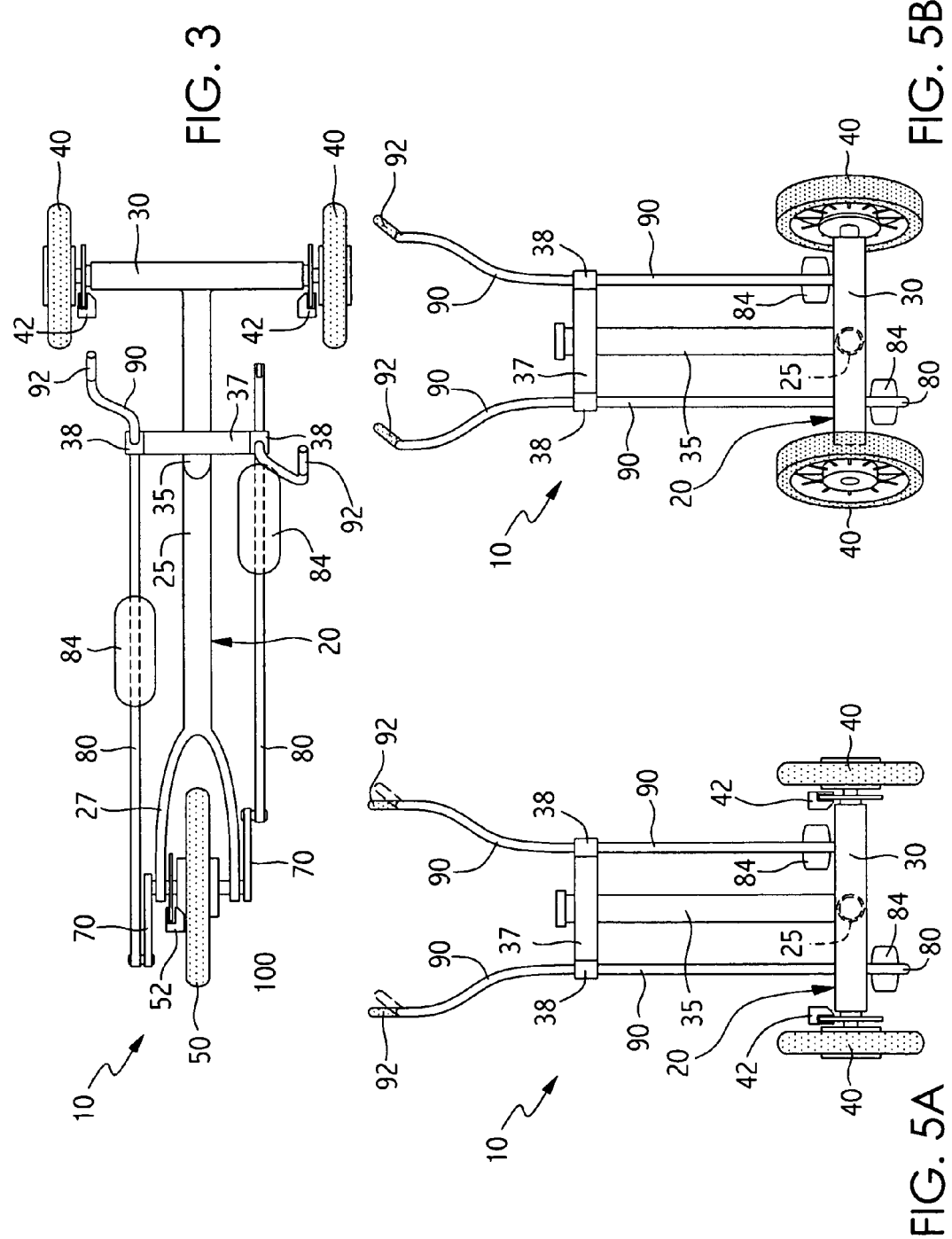

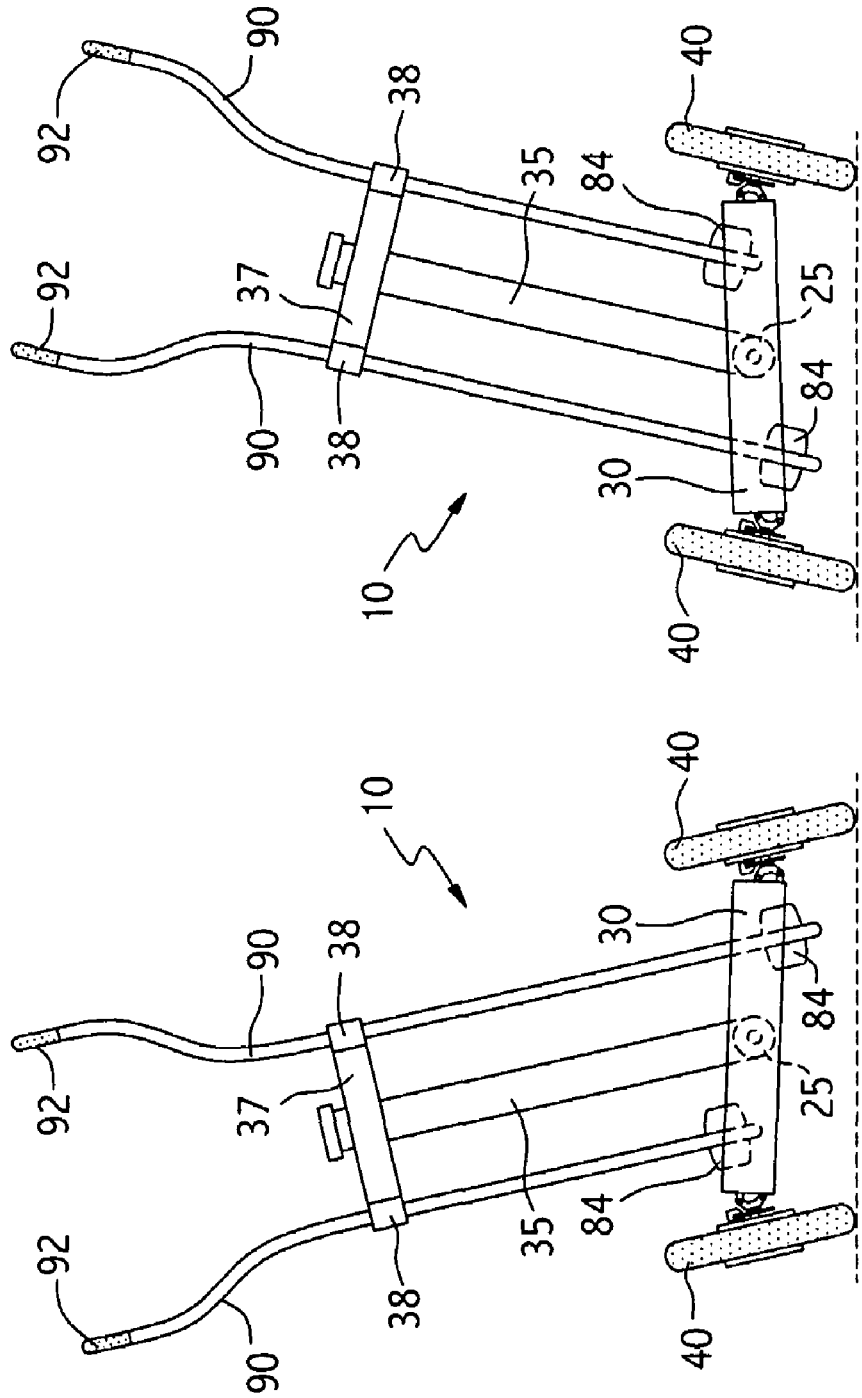

MOBILE ELLIPTICALLY DRIVEN DEVICE

BACKGROUND

The present invention provides a mobile platform driven by elliptical foot action and, in a preferred embodiment, reciprocal arm motion. The present invention is typically referred to herein as an "elliptical traveler," although it may be used for exercise, training, transportation, leisure, or any combination of the foregoing.

Bicycles provide an excellent means for transportation, leisure, and lower-body and cardiovascular exercise. However, bicycles do not provide appreciable upper-body exercise and the constant pressure against the seat and handlebars has been shown to result in pudendal and ulnar nerve neuropathy, respectively. Also, some persons may be unable or unwilling to ride a two-wheeled bicycle because it is inherently unstable. Running likewise provides excellent cardiovascular benefits and lower-body exercise. However, many runners are plagued by injuries from the impact and stresses of running, and some people are completely unable to run because of weight or other reasons. Cross-country skiing provides excellent exercise for both the upper and lower bodies, without the impact of running, but only a relatively small portion of the population can participate in this sport, and their participation is limited to the winter months.

Stationary trainers that utilize elliptical foot action with reciprocal hand action, closely emulating the body while ambulating, have become popular in recent years in health clubs. These devices offer weight-bearing exercise, reducing the risk of osteoporosis, with minimal joint stress since repeated impact with the surface is eliminated as the feet never leave the footbed. This smooth full body motion reduces the risk of injury from overuse of any one muscle group and improves fat mobilization, calorie burning and cardiovascular endurance at a reduced perceived rate of exertion, thus increasing the benefits of each session. However, such trainers are stationary and provide no means for transportation or outdoor leisure.

A mobile device is needed that provides an excellent means for exercise, preferably of both the upper and lower body, providing the user a weight-bearing exercise without impact, which may be used for transportation or leisure by a wide segment of the population. The present invention satisfies these needs by providing a stable, mobile device which utilizes ambulatory motion of the user's body for propulsion and which is easy to use by persons with a wide variety of physical abilities.

SUMMARY

One embodiment of the present invention is a mobile device comprising a frame including a longitudinal frame member oriented substantially horizontally, a transverse frame member oriented substantially horizontally, joined in a substantially normal orientation to the longitudinal member, and an upright frame member joined to the longitudinal member at a position rearward of said transverse member. On either end of the transverse frame member is a front wheel, and a rear wheel comprising a drive assembly is rotationally coupled to the rear end of said longitudinal frame member. The inner end of each of a pair of opposing cranks, oriented 180° apart, is attached to the drive assembly, such that the outer end of said cranks, when rotated, defines a path concentric with the axis of rotation of the rear wheel. A pair of elongate striding members is positioned substantially horizontally along either side of the longitudinal frame member, with the rearward end of each striding member rotationally coupled to the outer end of one of the cranks. A pair of upright arm levers, each with an upper grip end and a lower pivot end, is pivotally coupled to the upright frame member so that the upper and lower ends of the arm levers may reciprocate back and forth about the pivot point. The lower pivot end of each arm lever is pivotally coupled to the front end of one of the striding members. The drive assembly includes a hub body, a rotating axle (to which the inner ends of the crank arms are affixed), and an internal gear system translating the rotation of said axle to the hub body. The device also may include a mechanism for steering, including a wheel turning mechanism or a camber mechanism, as well as brakes and multiple gearing. An embodiment that does not utilize reciprocal arm motion to drive the device also is disclosed.

DESCRIPTION OF DRAWINGS

These and other features, aspects, structures, advantages, and functions are shown or inherent in, and will become better understood with regard to, the following description and accompanied drawings where:

FIG. 3 is a top view of the embodiment of FIG. 1;

FIGS. 5A-B are front views of an embodiment of the present invention utilizing a steering mechanism to turn the front wheels;

FIGS. 7A-B are front views of an embodiment of the present invention that utilizes a wheel camber mechanism to steer;

DETAILED DESCRIPTION

Figure 1:
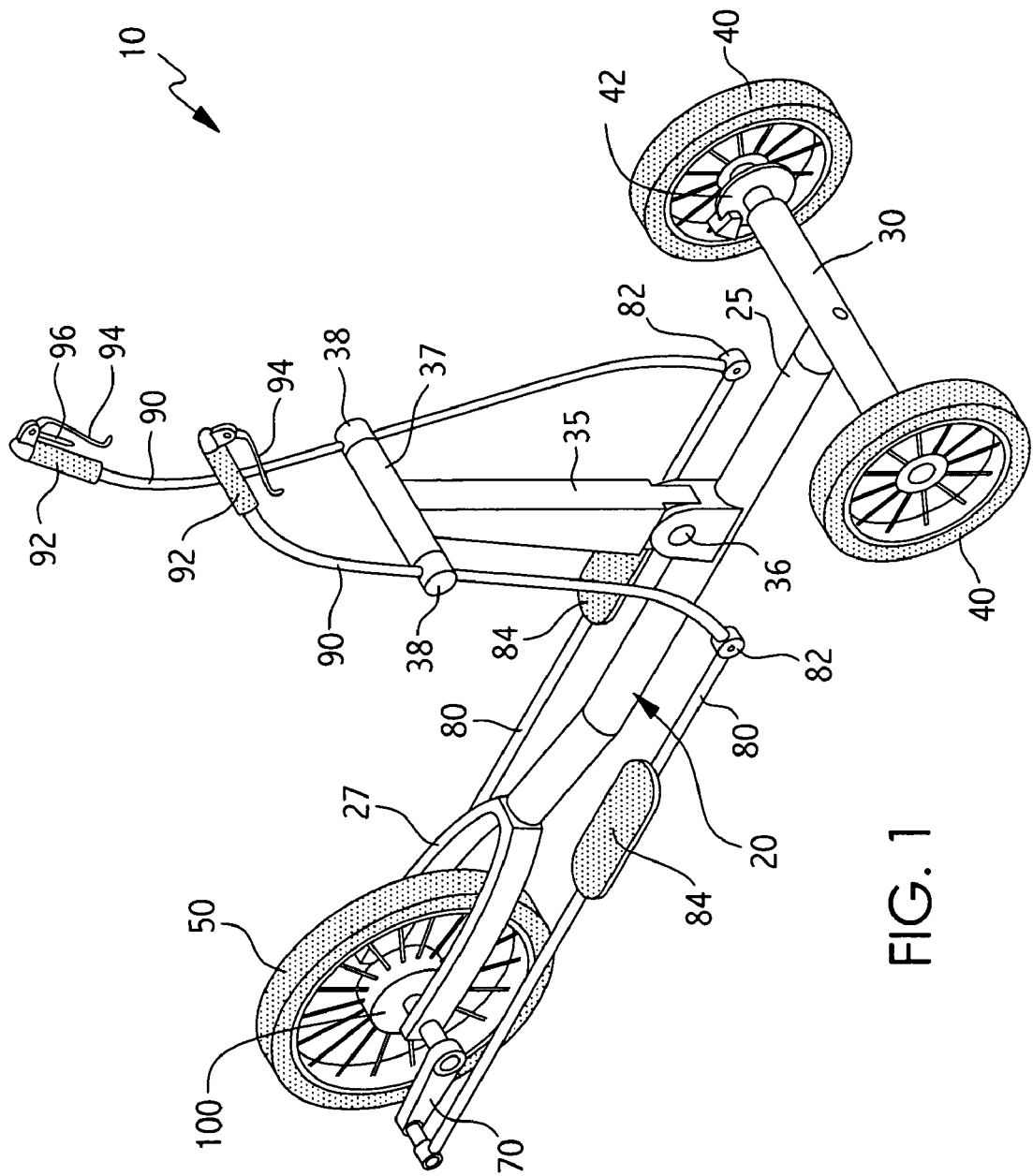
FIG. 1 is a perspective view of one embodiment of the present invention.

As shown in FIG. 1, one embodiment of the mobile elliptically driven device 10 (hereinafter referred to as the elliptical traveler) of the present invention comprises a frame 20, front wheels 40, a rear wheel 50, a pair of striding members 80, and arm members 90.

The frame 20 comprises a longitudinal, substantially horizontal frame member 25, a transverse, substantially horizontal frame member 30, and an upright frame member 35. The transverse frame member 30 is joined to the front end of longitudinal frame member 25. These components may be fixedly joined, or they may joined together in such a way as to allow the longitudinal frame member 25 to rotate axially a fixed amount within transverse frame member 30 to effect wheel camber for steering, as hereinafter described.

Figures 2, 4:
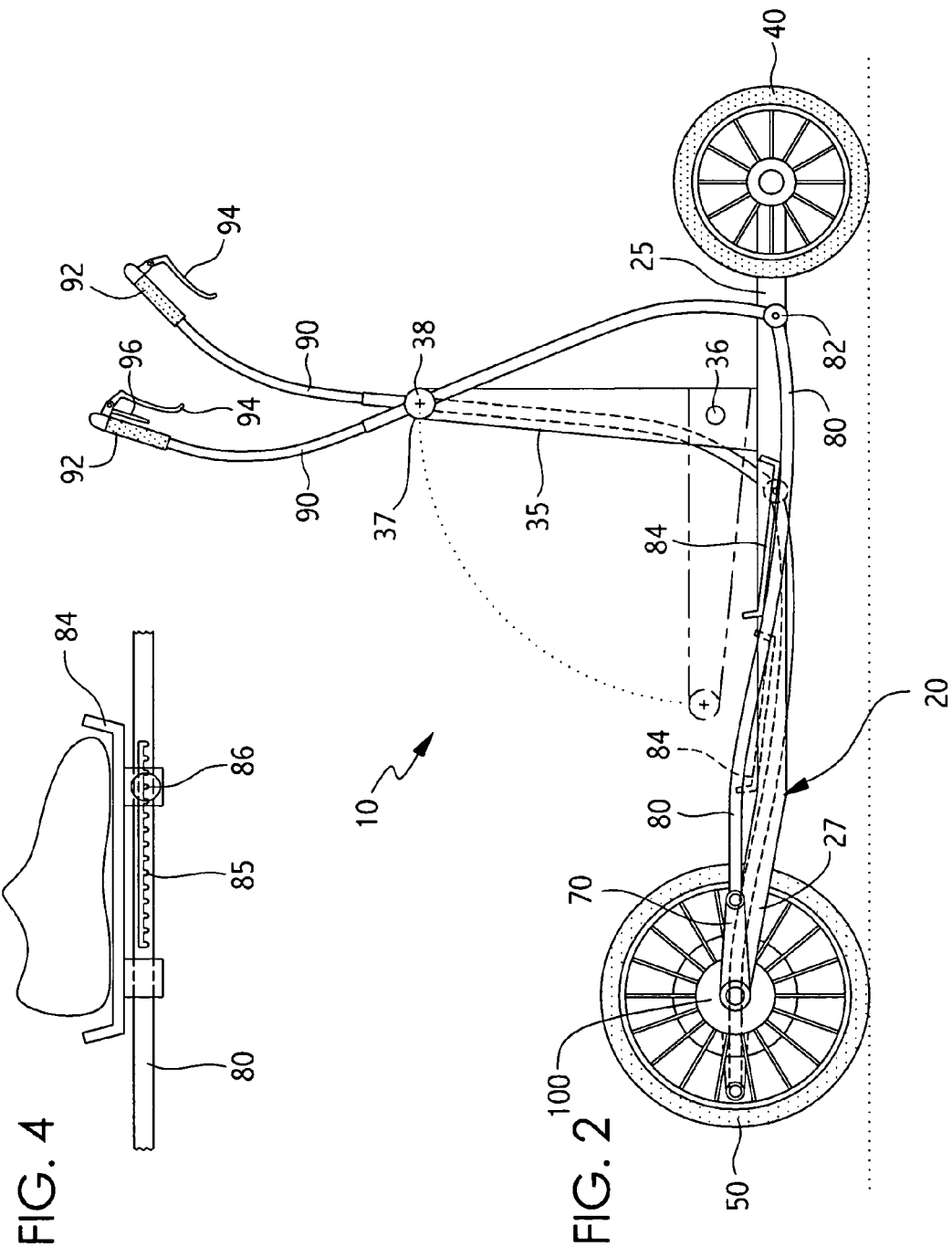
FIG. 2 is a side view of the embodiment of FIG. 1.
FIG. 4 is a side view of an adjustable footbed, which may optionally be utilized in the embodiment of FIG. 1.

The upright frame member 35 is mounted to the longitudinal frame member 25 such that it extends in a substantially upright manner from the longitudinal frame member 25. The upright frame member 35 is shown mounted in FIG. 1 in a substantially normal orientation, although it could be angled forwards or rearwards as might suit a particular design or application. Moreover, the upright frame member 35 may be mounted to the longitudinal member 25 via an adjustable joint 36, which may be tightened to fix upright frame member 35 in a desired position, and which also allows upright frame member to fold down, or collapse, to flatten the entire device for storage as shown in FIG. 2.

The longitudinal frame member may include a rear fork 27, in which the rear wheel 50 is mounted. Alternatively, the rear of longitudinal frame member 25 may comprise a single arm to which the rear wheel 50 is mounted. This single arm may be offset axially from the primary portion of the longitudinal frame member to allow the rear wheel to be centered under the rider (which is not necessary because this embodiment is self-standing, independent of whether the radial plane of the rear wheel is coplanar with the longitudinal axis of frame member 25). The front wheels are mounted on either end of the transverse frame member 30 via appropriate rotary couplings known in the art.

Along either side of longitudinal frame member 25 is a striding member 80. The rear or drive ends of the striding members are rotationally coupled in any conventional manner to a drive assembly 100 of the rear wheel (described in detail below), such as by one of a pair of opposing cranks 70. Each striding member may include a footbed 84 to provide a stable platform for the rider's feet. The front or pivot end of each striding member is pivotally connected to the bottom end of one of a pair of reciprocating arm members 90, each of which extends upwards generally along side the upright frame member 35 and terminates in a grip end 92. The upright frame member includes a crossbar 37, which includes a rotational coupling 38 on either end. Each arm member 90 is fixed to one of the rotational couplings 38.

When the rider applies force to the striding members to put them in motion, the rear end of each striding member 80, rotationally attached to crank 70, follows a circular path concentric with the rear wheel 50, while the front end of striding member 80 (defined by pivot joint 82) reciprocates in a substantially horizontal arcuate path. This action results in the footbed 84 tracing an elliptical path, and, more particularly, an asymmetrical ellipse with the arc of the front of the ellipse being smaller than that of the back (i.e., egg-shaped). The lower end of each arm member 90, attached to pivot joint 82, moves in conjunction therewith, while the grip end 92 also reciprocates through an arcuate path. Thus as may be seen from FIG. 1 in conjunction with the foregoing description, a rider may propel the elliptical traveler 10 forward by applying alternating force to the grip end 92 of each arm member 90 while striding with the legs and feet in a natural elliptical path on footbeds 84.

FIG. 4 shows an optional and exemplary means to make the position of each footbed 84 adjustable. In this embodiment, striding member 80 includes a notched cam cut 85. Footbed 84 includes a cam follower 86 with a tightening means (e.g., a nut and bolt, or screw) such that the rider may select the desired position of footbed 84 by sliding it along the cam cut 85 and tightening cam follower 86 in the desired notch. By altering the position of footbed 84, the rider alters, in the vertical dimension, the shape of the elliptical path traced by his feet as he rides traveler 10, and thus the rider may adjust the amount of leg lift utilized in each stride.

As noted, each arm member 90 terminates at its upper end in a grip end 92. The upper ends of arm members 90 may be adjustable in length to alter the length of travel of the grip ends 92.

Each grip end 92 includes a brake lever 94. One brake lever 94 operates the front brakes 42 via a cable routed between the brake lever and front brakes. The other brake lever 94 operates the rear brake 52, as shown in FIG. 3, via a cable routed between the brake lever and rear brake. The cables may be routed internal the arm members and frame components, or externally, or a combination thereof as desired, utilizing cable housing where necessary as known in the art. Disc brakes are shown, although other conventional braking mechanisms known in the art (such as a Y or caliper brake for the rear wheel) may be utilized.

One embodiment of elliptical traveler 10 is a direct-drive, straight-line device. However, it is believed that traveler 10 is more useful with gearing and a steering mechanism. Two embodiments of steering mechanisms for the elliptical traveler 10 are described below. An embodiment of elliptical traveler 10 could utilize either one of the steering mechanisms individually, or both steering mechanisms could be incorporated in an elliptical traveler 10, as desired or required by the application. The particular embodiments of steering mechanisms described below are in all respects exemplary, and any other suitable mechanism known in the art to steer a pair of transversely opposed wheels also could be used.

Figure 6:
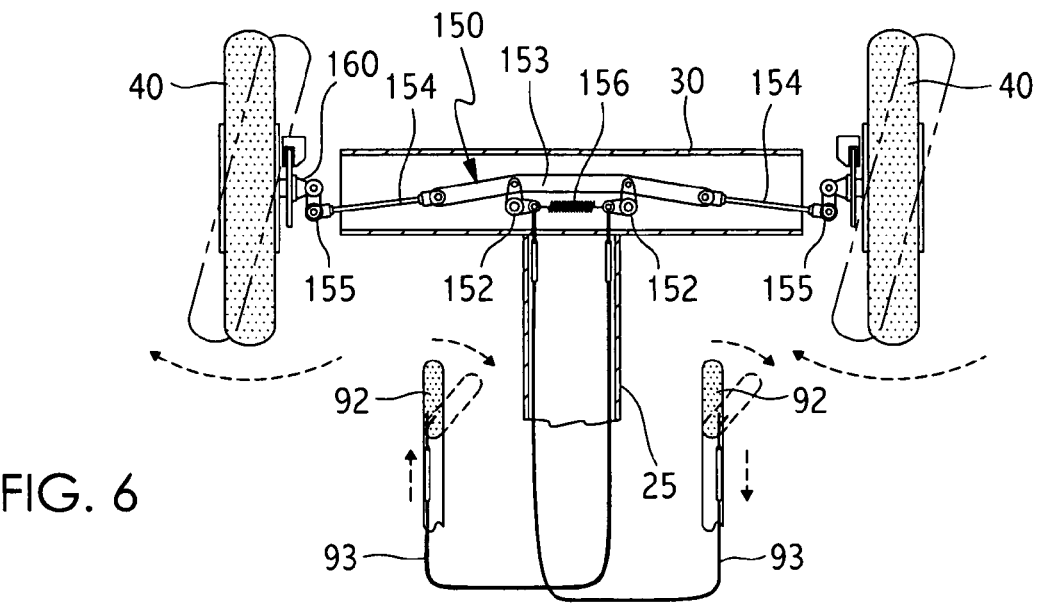
FIG. 6 is a top sectional view of the steering mechanism utilized in the embodiment of FIGS. 5A-B.
Figure 8A:
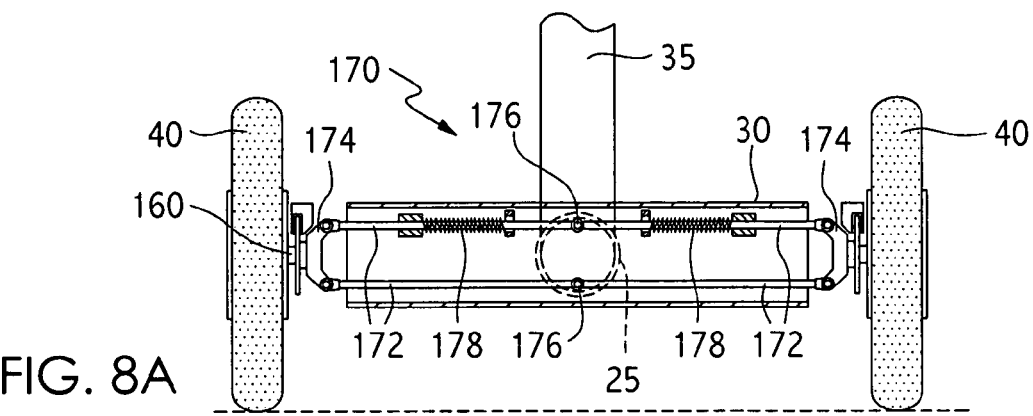
FIGS. 8A-B are front sectional views of the camber mechanism utilized in the embodiment of FIGS. 7A-B.
Figure 8B:
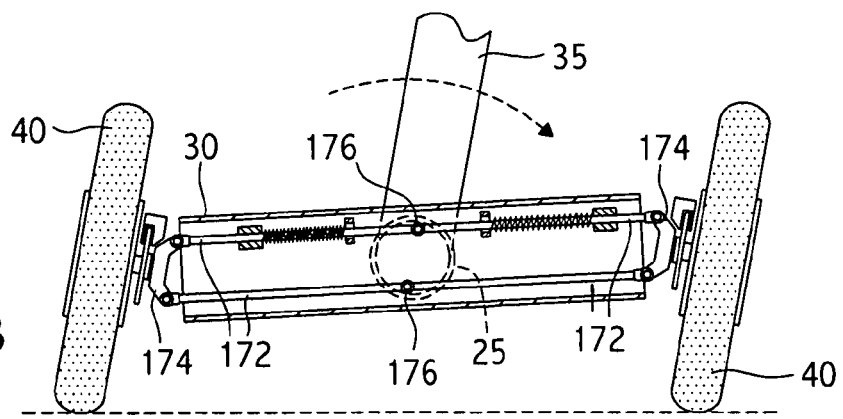

The first steering mechanism turns the wheels left or right, as one does when steering a car. As shown in FIGS. 5A-B and 6, each grip end 92 may pivot (e.g., transversely, left or right). A cable 93 connects each grip end 92 to a turning mechanism 150 contained within transverse frame member 30. As shown, when either of cable 93 is pulled by pivoting grip end 92, the longitudinal force exerted by cable 93 is translated to a transverse force on the turning mechanism 150 by control arm 152, which in turn is coupled to each axle of the front wheels 40 via the linkage arms 153, and linkage members 154 and 155, to the rotary coupling 160 shown in FIG. 6, thus causing the front wheels 40 to pivot or turn. The rider controls which direction the wheels 40 turn by exerting force on the corresponding grip end 92. The steering mechanism 150 also may include a bias member 156, shown as a spring, to center bias the steering mechanism and thus keep the wheels directed in a straight line in the absence of an applied force on one of the grip ends 92. As noted, the steering mechanism 150 shown in FIG. 6 is exemplary only, and any steering linkage known in the art could be used. Further, hydraulic, pneumatic, or electrical (e.g., servo motors) actuators could be used in lieu of the cable-driven system shown.

A second mechanism for steering is shown in FIGS. 7A-B and 8A-B, which effects steering by wheel camber. The camber mechanism 170 is contained within the transverse frame member 30. The camber mechanism 170 comprises two parallel linkage members 172 coupled to C-shaped members 174, which in turn are coupled through the rotary coupling 160 to the axles of the front wheels 40. Many designs for a rotary coupling 160, such as an axle mounted to a gimbal-type joint, capable of permitting rotation of the front wheel about the axle while translating force for the turning and camber of the wheels to the axle as described above are known in the mechanical arts. Each parallel linkage member 172 is fixed, such as via rods 176, to points at or near the circumference approximate the front end of longitudinal frame member 25. The coupling that joins the front end of longitudinal frame member 25 with the transverse frame member 30 permits partial rotation of longitudinal frame member 25, which is effected by the rider shifting his weight or leaning towards one side. The camber mechanism 170 translates the arcuate partial rotation of longitudinal frame member 25 into wheel camber as shown, thus causing the elliptical traveler 10 to curve in the direction desired by the rider. The camber mechanism 170 may also comprise a center bias means 178, shown as a spring, to keep the wheels in a vertical orientation in the absence of applied force by the rider and also to limit the degree of camber. Note that any biasing means may be used for this purpose, such as a bushing (made of a rubber, polymeric, or other dampening material), or a combination of bushings and springs. As noted, the camber mechanism shown is illustrative only. Any conventional mechanical or electromechanical assembly to effect wheel camber could be used without departing from the scope and spirit of this embodiment of the present invention.

Figure 9:
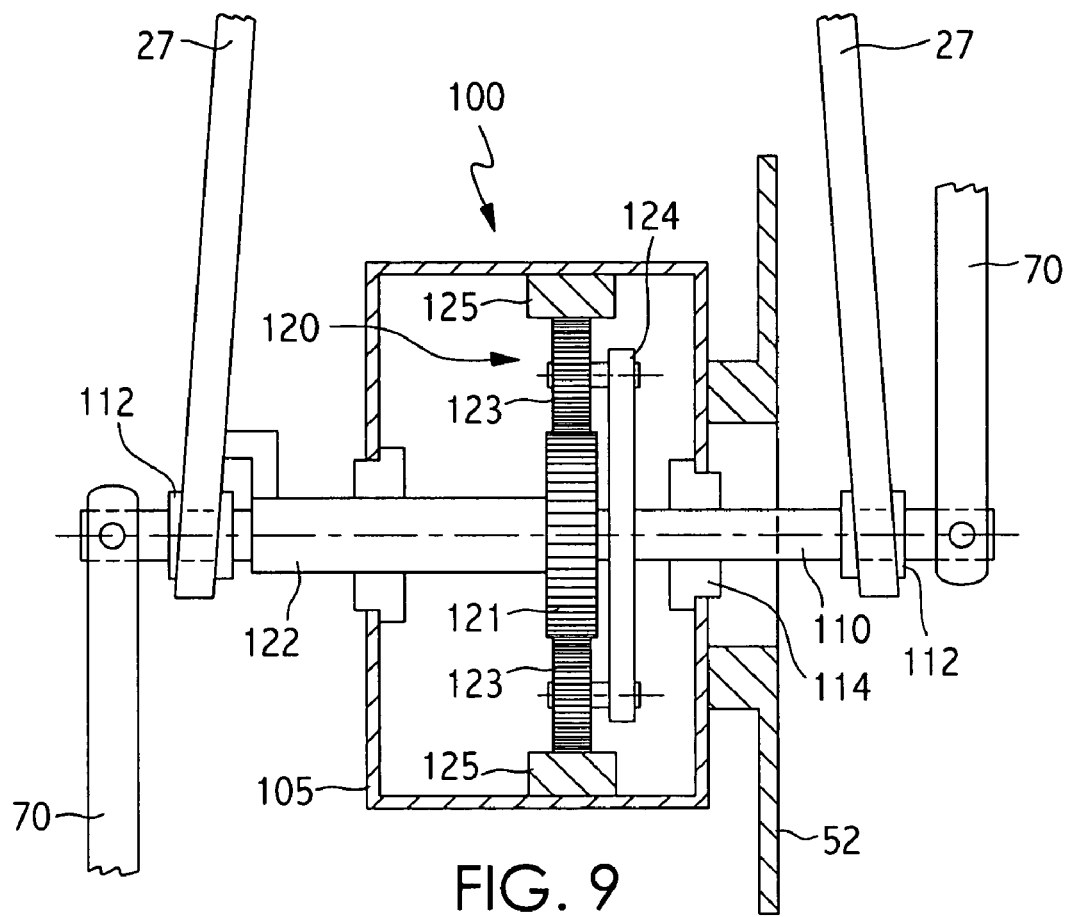
FIG. 9 is a top sectional view of an exemplary drive assembly of the embodiment of FIG. 1.

One embodiment of the drive assembly 100 is shown in FIG. 9. The drive assembly 100 comprises a hub body 105, an axle 110, and an internal gear system 120. The hub body 105 is connected mechanically to the rim of the rear wheel 50, via spokes or other traditional mechanical means (e.g., a metallic wheel body, a composite disc, etc.). Also, the disc of rear brake 52 is shown as attached to the hub body 105.

One of the pair of opposing cranks 70 is attached to either end of the axle 110 via any conventional mechanical attachment means. (Note that one or both of the attachment means between the crank 70 and the axle 110 could be releasable, such that with the attachment released one crank 70 could be rotated into alignment with the other crank 70 to allow the traveler 10 to be folded into the smallest possible size when the upright frame member 35 is collapsed, as described above.)

The axle 110 extends through the rear end of each arm of the fork 27, through the axis of the hub body 105, and through the sun gear arm 122 described below. Free rotation of the crank within the fork 27, hub body 105, and sun gear arm 122 is permitted by fork bearings 112, hub bearings 114, and sun gear arm bearings (not shown).

Figure 10:
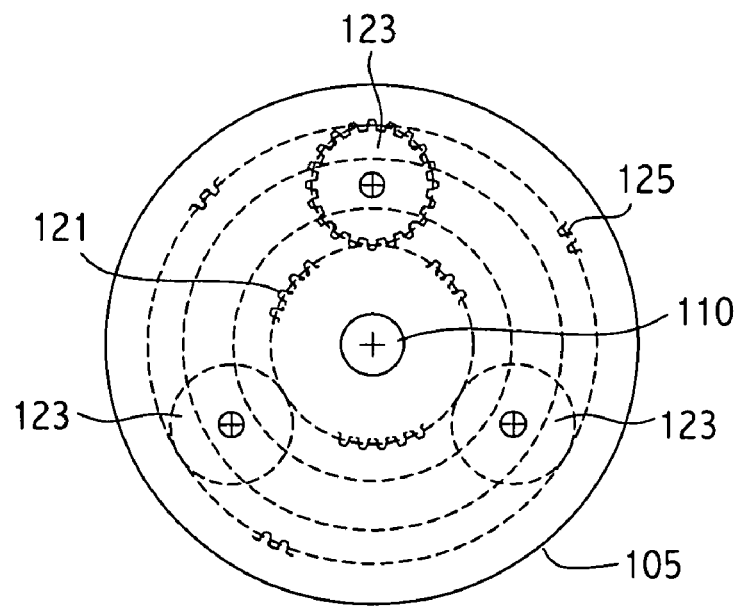
FIG. 10 is a schematic view of an exemplary internal gear system of the drive assembly of FIG. 9.

The internal gear system 120 is located inside the hub body 105. Note that the internal gear system 120 shown in FIGS. 9-10 is illustrative only; any internal gearing system utilizing a rotating axle known in the art, or hereinafter developed, could be used and employed. The internal gear system 120 is shown for illustration purposes to be a planetary gear system. A central or sun gear 121 is held in a fixed (non-rotating) position by sun gear arm 122, which connects the sun gear 121 to the frame. Planetary gears 123 rotate about sun gear 121. The planetary gears in turn contact a complementary ring gear 125 on the inside surface of hub body 105. The planetary gears are mounted to planetary gear carrier 124, which is fixedly attached to the axle 110.

As the rider applies force to the striding members 80 and arm members 90, thereby rotating the cranks 70 and axle 110, rotary motion is imparted to the hub body 105 via internal gear system 120. The ratio between the rotation of the axle and rotation of the rear wheel can be altered by altering the gear ratio between the planetary and sun gears, as is known in the art.

Internal gear system 120 is shown as a single-gear system for simplicity. Those skilled in the art will recognize that multiple gear ratios can be achieved by providing additional planetary gear combinations that may be switched in and out between the sun gear 121 and the ring gear 125 on the inside surface of hub body 105. Such gearing systems, called compound planetary gear systems, typically utilize the variable tension of a cable in combination with a spring to switch the active gear. For this reason, as shown in FIGS. 1-2, one grip end 92 additionally includes a shift lever 96, from which a cable (not shown) is routed either internally within the frame or externally alongside it to the internal gear system, as is known in the art. Likewise, manufacturers of internal gear hubs are beginning to use electrically driven shift systems. Any such shifting system known in the art or hereinafter developed could be used in this embodiment of the present invention.

Figure 11:
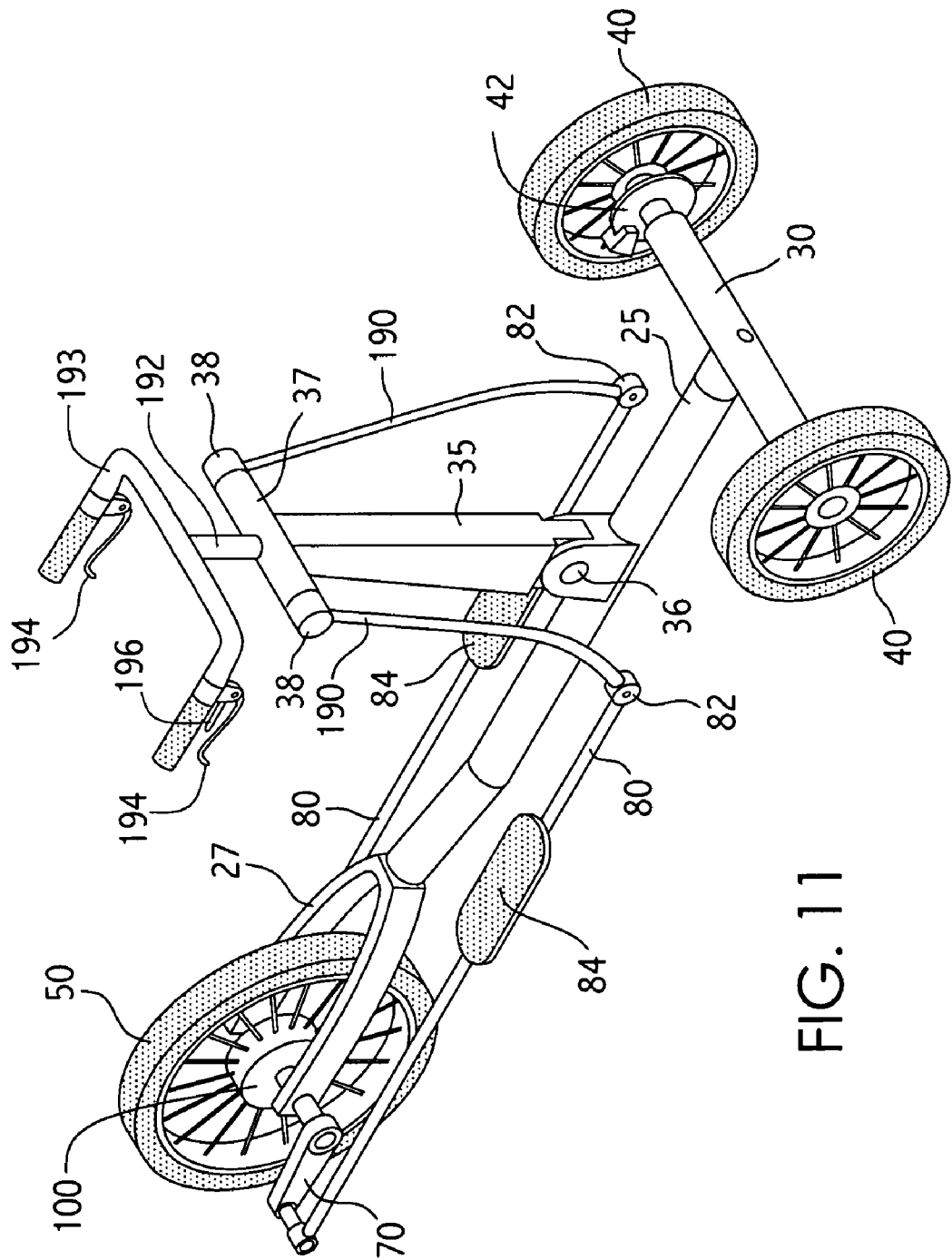
FIG. 11 is a perspective view of an embodiment of the present invention that does not use reciprocal arm motion.

An alternative embodiment that does not utilize reciprocal arm motion to propel the elliptical traveler is shown in FIG. 11. Instead, the striding members 80 are pivotally to the lower end of a pair of supports 190, the upper ends of which are fixed to rotational couplings 38 at either end of crossbar 37. The striding members 80 (and the footbeds 84) therefore follow the essentially same path in this embodiment as described above. A handlebar 193 is connected to crossbar 37 by a stem 192. The handlebar 193 is fitted with brake levers 194 and shift lever 196, which operate in a manner similar to that described above. Further, either of the steering mechanisms described herein may be utilized with this embodiment. With respect to the wheel turning mechanism, force is translated by any conventional means to the turning mechanism by the turning of the handlebar. The height of stem 192 may be made adjustable to suit the needs of the rider, and the shape of the handlebar 193 is exemplary. Any shape of handlebar could be utilized as desired by a particular rider.

Although the present invention has been described and shown in considerable detail with reference to certain preferred embodiments thereof, other embodiments are possible. Variations of the present invention could be implemented in a two-wheel embodiment (single front wheel and single rear wheel), or in a three-wheeled embodiment with a single front wheel and dual rear wheels. The foregoing description is therefore considered in all respects to be illustrative and not restrictive. Therefore, the present invention should be defined with reference to the claims and their equivalents, and the spirit and scope of the claims should not be limited to the description of the preferred embodiments contained herein.

I claim:

1. A mobile device adapted to utilize ambulatory motion of the user's body for propulsion comprising:
 a frame comprising
   a longitudinal frame member oriented substantially horizontally, having a front end and a rear end;
   a transverse frame member oriented substantially horizontally, having two ends, joined between said ends of the transverse frame member to said longitudinal member, in a substantially normal orientation thereto; and
   an upright frame member having a top end and a bottom end, the bottom end joined to said longitudinal member at a position rearward of said transverse member;
 two front wheels, one of said front wheels rotationally coupled to each end of said transverse frame member;
 a rear wheel comprising a drive assembly rotationally coupled to said longitudinal frame member proximate the rear end thereof, said drive assembly comprising a rotating axle, a hub, and a gear system internal to said hub transferring rotation of said axle to rotation of said hub in a predetermined ratio of axle rotation to hub rotation;
 a pair of opposing cranks, each crank having an inner end and an outer end, the inner end of each crank fixedly attached to one end of said axle;
 a pair of elongate striding members, adapted to receive the feet of said user and support said user while ambulating, said members positioned substantially horizontally along either side of said longitudinal frame member, having a front pivot end and a rearward drive end, the rearward drive end of each striding member rotationally coupled to the outer end of one of said cranks; and
 a pair of upright arm levers having an upper grip end and a lower pivot end, said arm levers pivotally coupled to said upright frame member at a point between said ends of the upright arm levers, the lower pivot end of each said lever pivotally coupled to the front pivot end of one of said striding members;

wherein the connection of said transverse frame member and said longitudinal frame member permits partial axial rotation of said longitudinal member, and the device further comprising a camber mechanism coupled to each of the front wheels and affixed to said longitudinal member, said camber mechanism adapted to translate arcuate movement from partial axial rotation of said longitudinal member into wheel camber, thereby causing said device to turn.

2. The device of claim 1, wherein said upright frame member is releasably pivotally joined to said longitudinal member, such that said upright frame member may be collapsed against said longitudinal member for storage.

3. The device of claim 1, in which said rotational coupling of said front wheels to said transverse frame member allows said front wheels to camber, such that said ambulatory user may steer said device by shifting his weight laterally.

4. The device of claim 1 wherein said striding member comprises a footbed and means for adjusting the longitudinal position of said footbed on said striding member.

5. A mobile device adapted to utilize ambulatory motion of the user's body for propulsion comprising:
a frame having a front end and a rear end;
a front wheel and a rear wheel, the rear wheel comprising a drive assembly, the front wheel rotationally coupled to said frame approximate the front end of the frame, and the rear wheel rotationally coupled to said frame via said drive assembly approximate said rear end of said frame;
said drive assembly comprising a hub body, a rotating axle, and an internal gear system translating the rotation of said axle to said hub body;
a pair of elongate striding members, adapted to receive the feet of said user and support said user while ambulating, with a rear drive end and a front pivot end, the rear drive end of each of said striding members rotationally coupled to said drive assembly, such that the drive end of said striding members when rotated traces a path concentric with said rear wheel; and
a pair of upright arm members having an upper grip end and a lower pivot end, the lower pivot end of each of said arm members pivotally coupled to the pivot end of one of said striding members and wherein each said upright arm member is pivotally coupled to said frame at a point intermediate the ends of each said arm member
wherein the frame permits partial axial rotation of a portion thereof, and the device further comprising a camber mechanism coupled to the front wheel and affixed to said rotatable portion of the frame, said camber mechanism adapted to translate arcuate movement from partial axial rotation of said rotational portion of the frame into wheel camber, thereby causing said device to turn.

6. The device of claim 5, wherein
said frame comprises
a longitudinal frame member oriented substantially horizontally, having a front end and a rear end;
a transverse frame member oriented substantially horizontally, having two ends, joined between said ends to said longitudinal member, in a substantially normal orientation thereto; and
an upright frame member having a top end and a bottom end, the bottom end joined to said longitudinal member at a position rearward of said transverse member; and further comprising a second front wheel, one of said front wheels rotationally coupled to each end of said transverse frame member.

7. The device of claim 6, wherein said upright frame member is releasably pivotally joined to said longitudinal member, such that said upright frame member may be collapsed against said longitudinal member for storage.

8. The device of claim 5, further comprising a pair of opposing cranks and wherein the rear drive end of each of said striding members is rotationally coupled to said drive assembly by one of said cranks.

9. A mobile device adapted to utilize ambulatory motion of the user's body for propulsion comprising:
a frame comprising
a longitudinal frame member oriented substantially horizontally, having a front end and a rear end;
a transverse frame member oriented substantially horizontally, having two ends, the front end of the longitudinal member joined to the transverse member and capable of partial axial rotation through a predetermined arc; and
an upright frame member having a top end and a bottom end, the bottom end joined to said longitudinal member at a position rearward of said transverse member;
two front wheels, one of said front wheels rotationally coupled to each end of said transverse frame member;
a camber mechanism coupled to each of said front wheels and affixed to said longitudinal member, said mechanism adapted to translate the arcuate movement from the partial rotation of said longitudinal member into wheel camber, thereby causing said device to turn;
a rear wheel comprising a drive assembly rotationally coupled to the rear end of said longitudinal frame member;
a pair of elongate striding members, adapted to receive the feet of said user and support said user while ambulating, positioned substantially horizontally along either side of said longitudinal frame member, having a front pivot end and a rearward drive end, the rearward drive end of each striding member coupled to said drive assembly; and
a pair of upright arm levers having an upper grip end and a lower pivot end, said arm levers pivotally coupled to said upright frame member at a point between said ends, the lower pivot end of each said lever pivotally coupled to the front pivot end of one of said striding members.

10. The device of claim 9, wherein said drive assembly comprises a rotating axle, a hub body, and an internal gear system translating the rotation of said axle to said hub body a gear system internal to said hub, and wherein the rear drive end of each of said striding members is rotationally coupled to said drive assembly by one of a pair of cranks coupled to said axle.

11. The device of claim 9, wherein said upright frame member is releasably pivotally joined to said longitudinal member, such that said upright frame member may be collapsed against said longitudinal member for storage.

12. A mobile device adapted to utilize ambulatory motion of the user's body for propulsion comprising:
a frame with a front end and a rear end;
two front wheels rotationally coupled proximate the front end of said frame on either side thereof;
a camber mechanism coupled to each of said front wheels and to said frame, said mechanism adapted to allow said ambulatory user to translate a lateral shift in said user's body weight into wheel camber, thereby causing said device to turn;

a rear wheel comprising a drive assembly rotationally coupled to said frame proximate the rear end thereof;

a pair of opposing cranks, each crank having an inner end and an outer end, the inner end fixedly attached to said drive assembly;

a pair of elongate striding members, adapted to receive the feet of said user and support said user while ambulating, positioned substantially horizontally along either side of said frame, having a front pivot end and a rearward drive end, the rearward drive end of each striding member rotationally coupled to the outer end of one of said cranks; and a pair of upright arm levers having an upper grip end and a lower pivot end, said arm levers pivotally coupled to said frame at a point between said ends, the lower pivot end of each said lever pivotally coupled to the front pivot end of one of said striding members.

13. The device of claim 12, wherein said drive assembly comprising a rotating axle, a hub, and a gear system internal to said hub transferring rotation of said axle to rotation of said hub in a predetermined ratio of axle rotation to hub rotation.

14. The device of claim 13, wherein said gear system comprises a plurality of said predetermined ratios.

* * * * *